(12) United States Patent
Snyder

(10) Patent No.: US 10,654,506 B2
(45) Date of Patent: *May 19, 2020

(54) GYROSCOPICALLY-RESPONSIVE POWER ASSISTED MOMENT ARM FOR LOAD CARRYING DEVICES

(71) Applicant: Secure Information Devices Inc., Beaver, PA (US)

(72) Inventor: John B. Snyder, Pittsburgh, PA (US)

(73) Assignee: Secure Information Devices Inc., Beaver, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,606

(22) Filed: Sep. 10, 2018

(65) Prior Publication Data

US 2019/0002006 A1    Jan. 3, 2019

Related U.S. Application Data

(63) Continuation of application No. 15/017,273, filed on Feb. 5, 2016, now Pat. No. 10,093,337.

(51) Int. Cl.
| | |
|---|---|
| *B62B 5/00* | (2006.01) |
| *B62B 1/18* | (2006.01) |
| *B62M 6/50* | (2010.01) |
| *G05D 1/08* | (2006.01) |

(52) U.S. Cl.
CPC .............. *B62B 5/0073* (2013.01); *B62B 1/18* (2013.01); *B62B 5/0043* (2013.01); *B62M 6/50* (2013.01); *G05D 1/0891* (2013.01)

(58) Field of Classification Search
CPC ......... B62B 1/18; B62B 1/183; B62B 5/0043; B62B 5/0046
See application file for complete search history.

(56) References Cited

U.S. PATENT DOCUMENTS 5,465,801 A * 11/1995 Hoover ................. B62B 5/0026
                                                          180/13
6,470,981 B1 * 10/2002 Sueshige ................... B62B 1/18
                                                          180/19.3

(Continued)

FOREIGN PATENT DOCUMENTS

WO        2017031538 A1      2/2017

OTHER PUBLICATIONS

No Author. "How it Works." RYNO Motors. Dec. 9, 2013. Web: https://rynomotors.com/the-ride/how-it-works/ 5 pages.

*Primary Examiner* — Tony H Winner
(74) *Attorney, Agent, or Firm* — Leason Ellis LLP

(57) ABSTRACT

A gyroscopically-responsive power assisted moment arm is disclosed for use in connection with vehicles such as load carrying devices. A moment arm extends to a pivot point such that when a longitudinal force is applied at the moment arm, a sensor senses such force and outputs an energizing signal to a motor to drive a wheel. If a rotational or vertical force is applied to the moment arm, the motor need not be driven. According to the invention, therefore, a power assist can be provided to a user to drive a wheel in a desired direction of transport while not causing drive during tipping or unloading of the load carrying portion of the vehicle. Such an apparatus can be advantageously applied to a power assisted wheelbarrow, as one exemplary application.

20 Claims, 3 Drawing Sheets

(56) References Cited

U.S. PATENT DOCUMENTS

| | | | |
|---|---|---|---|
| 8,523,198 B2 * | 9/2013 | Albert | B62B 1/18 |
| | | | 280/43.14 |
| 8,800,697 B2 | 8/2014 | Hoffmann et al. | |
| 8,869,922 B1 | 10/2014 | Isola | |
| 2003/0178801 A1 | 9/2003 | Hart | |
| 2011/0313604 A1 * | 12/2011 | Kume | B62B 3/001 |
| | | | 701/22 |
| 2012/0126502 A1 * | 5/2012 | Robinson | B62B 1/202 |
| | | | 280/47.31 |
| 2014/0058600 A1 | 2/2014 | Hoffmann et al. | |
| 2015/0027794 A1 | 1/2015 | Vandelinde | |

* cited by examiner

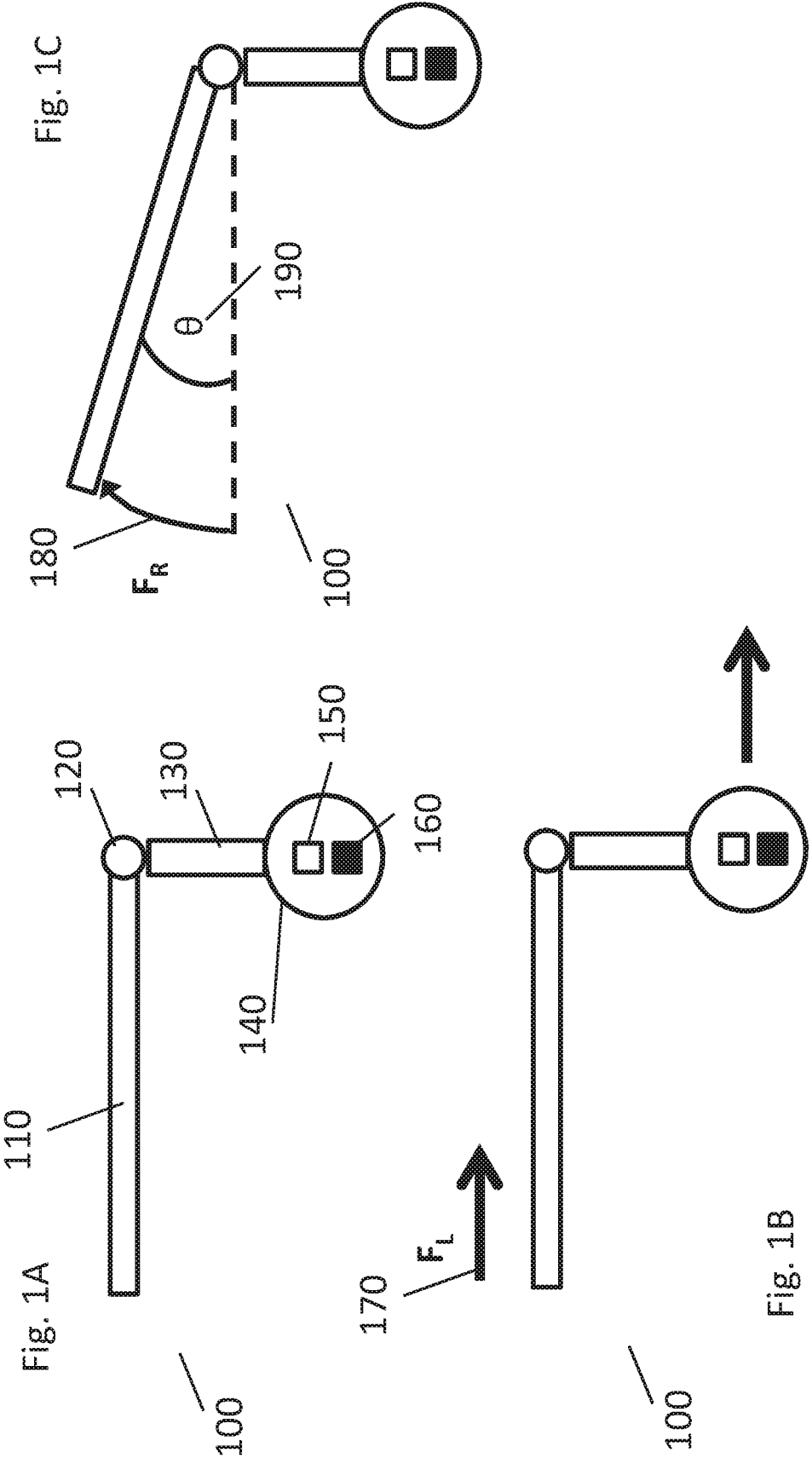

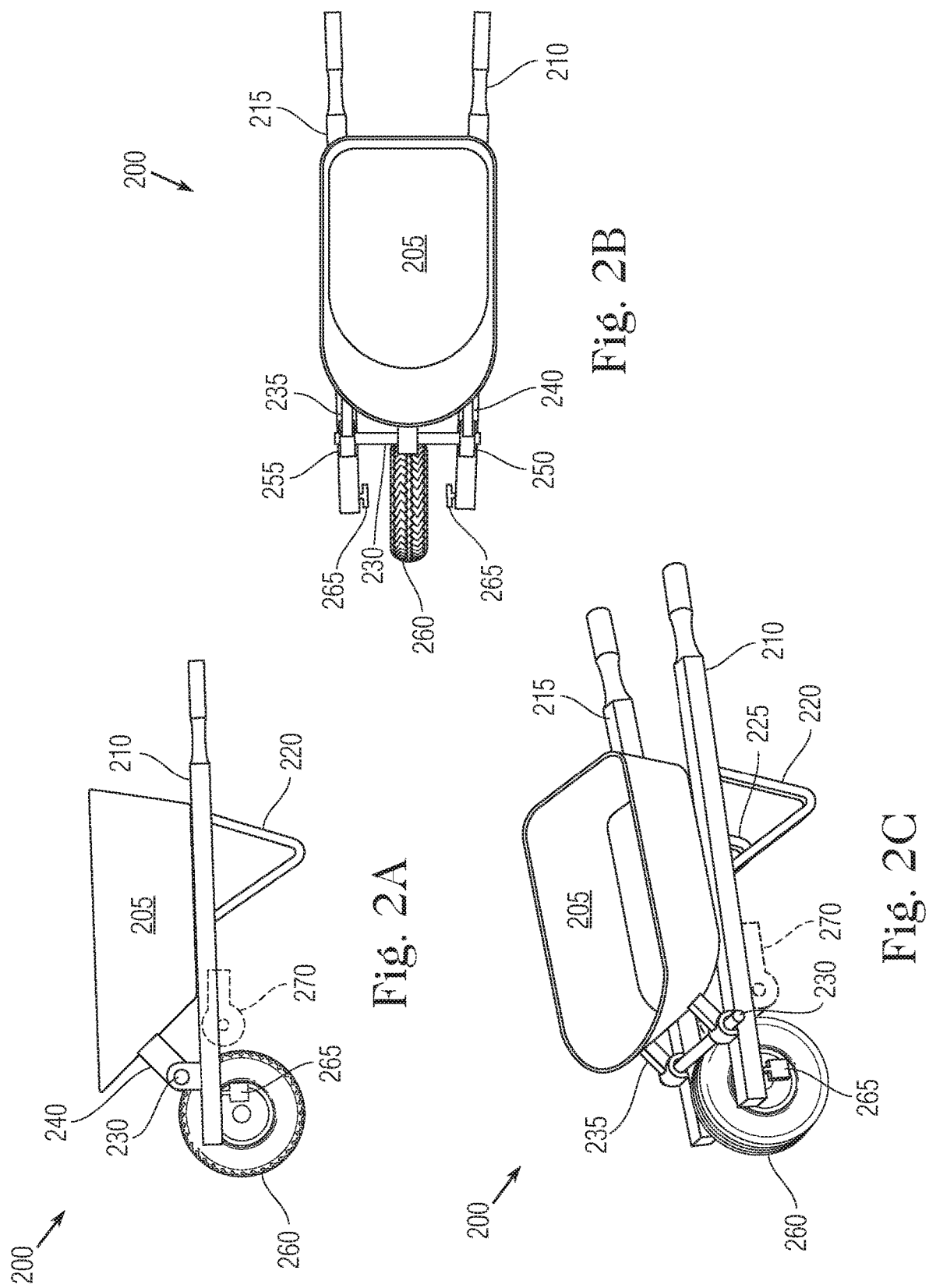

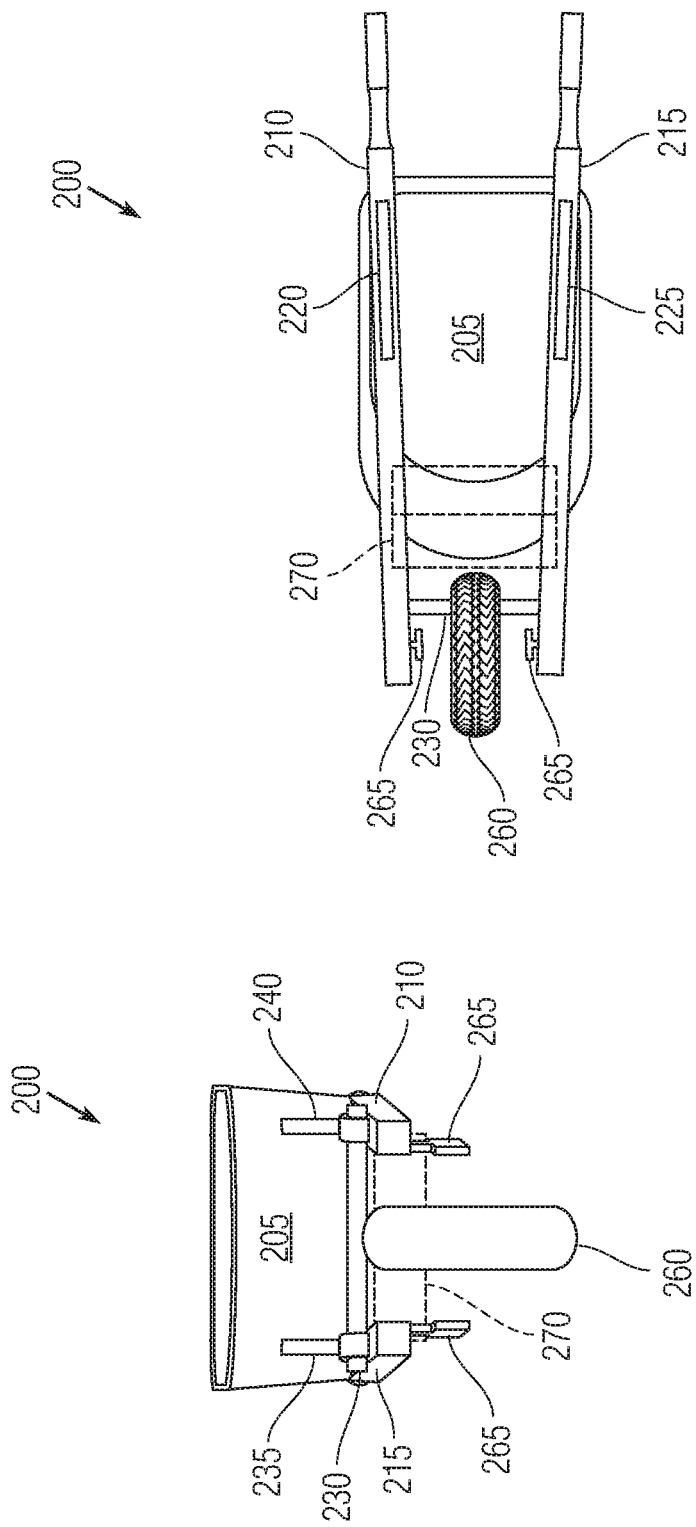

GYROSCOPICALLY-RESPONSIVE POWER ASSISTED MOMENT ARM FOR LOAD CARRYING DEVICES

CROSS-REFERENCE TO RELATED APPLICATIONS

This application is a continuation of and claims the benefit of priority under 35 U.S.C. § 120 to U.S. patent application Ser. No. 15/017,273, entitled "GYROSCOPICALLY-RESPONSIVE POWER ASSISTED MOMENT ARM FOR LOAD CARRYING DEVICES INCLUDING PIVOTAL LOAD CARRYING DEVICES" filed Feb. 5, 2016, which is hereby incorporated by reference as if set forth in its entirety herein.

FIELD OF THE INVENTION

The present invention generally relates to apparatuses for providing a power assist to a vehicle. In particular, the invention relates to apparatuses that provide gyroscopically-responsive power-assist to vehicles such as load carrying devices that are operable via a moment arm. In further aspects, the invention relates to apparatuses for gyroscopically sensing the type of force applied to a moment arm and correspondingly driving a wheel in response to the type of force applied, independent of a tipping or carrying of a supported load.

BACKGROUND OF THE INVENTION

Load transport is a practice with origins dating back to ancient times. For example, wheelbarrows and similar apparatuses can reduce the effort a person must exert in order to transport a load. The addition of a motor capable of driving a wheel connected to the load transport can further reduce the effort needed. However, presently, such conventional motorized load transports are inefficient and unintuitive when interpreting the type of force applied at a moment arm of the load transport.

While a motorized transport can include a variety of sensors in order to determine the orientation of the wheel and provide power assist, such apparatuses, as known to the applicant, lack the ability to differentiate between a force meant to drive the wheel (e.g., a force in the direction of transport) and a force meant to unload the transport and not drive the wheel (e.g., a force to unload the transport, such as a rotational force).

Therefore, what is needed in the art is an apparatus that can extend the moment arm of a load transport to a pivot point, so that a gyroscopically-responsive power assist can be employed to differentiate between different applied forces and drive the apparatus accordingly. What is further needed in the art is such an apparatus that is further configured, in certain implementations, to only selectively provide power assist as a function of the differentiated applied forces, so that, for instance, a load can be tipped without causing the drive motor to be energized during that operation.

It is in regard to these issues that the present invention is provided.

BRIEF DESCRIPTION OF THE DRAWINGS

The accompanying drawing figures illustrate example embodiments and are not intended to be limiting of the invention. Among the drawing figures, like references are intended to refer to like or corresponding parts:

FIG. 1A illustrates an example moment arm extension apparatus in a stable state in accordance with at least one embodiment of the present invention;

FIG. 1B illustrates the example moment arm extension apparatus of FIG. 1A upon receiving a force in the desired direction of the apparatus's travel in accordance with at least one embodiment of the present invention;

FIG. 1C illustrates the example moment arm extension apparatus of FIGS. 1A and 1B upon receiving a rotational force in accordance with at least one embodiment of the present invention;

FIG. 2A illustrates a side view of an example application of a moment arm extension apparatus as applied to a wheelbarrow in accordance with at least one embodiment of the present invention;

FIG. 2B illustrates a top view of the embodiment of FIG. 2A;

FIG. 2C illustrates a side isometric view of the embodiment of FIG. 2A;

FIG. 2D illustrates a front view of the embodiment of FIG. 2A; and

FIG. 2E illustrates a bottom view of the embodiment of FIG. 2A.

SUMMARY OF THE INVENTION

Embodiments of the invention are directed towards providing a power assist to a user for carrying a load, and more specifically a moment arm is extended to a pivot point and a sensor can sense different types of forces to output signals to a motor which then drives a wheel.

In accordance with one aspect of the invention, an apparatus is provided for translating an applied longitudinal force to a rotational force for providing the power assist to a freely rotatable wheel. The apparatus according to this embodiment includes a moment arm component disposed along a longitudinal axis, having a proximal end and a distal end. A pivot point is disposed at the distal end of the moment arm component, such that at least a portion of the moment arm component is capable of free rotation about the pivot point around a first rotational axis. The apparatus further includes a single wheel, which is rotatably mounted about a second rotation axis, and is in connection with the pivot point. The single wheel can extend at least partially below a lower edge of the moment arm component. Additionally, the apparatus includes a motor connected to drive the wheel when energized.

Continuing with this aspect of the invention, the apparatus includes one or more sensors configured to sense a longitudinal force applied substantially along the longitudinal axis of the moment arm and configured to sense a rotational force applied about the pivot point. Finally, the apparatus includes a control system that is configured to output an energized signal for controlling power being provided to energize the motor. Such a control system activates or deactivates the motor using the energized signal by sensing at the one or more sensors whether a longitudinal force has been applied to the moment arm. Likewise, the control system accelerates or decelerates the wheel depending on the magnitude and direction of the longitudinal force. In some embodiments, the control system selectively activates the motor, that is, it does not activate the motor if the one or more sensors sense that a rotational force has been applied to the moment arm.

In accordance with another aspect of the invention as may be implemented in various embodiments, an apparatus is provided for providing a gyroscopically-responsive power assist to a user for carrying a load. The apparatus includes a pair of frame support members. An elongated wheel support member transversely couples the pair of frame support members along a horizontal axis. A pivot is centrally located relative to the wheel support member, in which the pivot provides rotation of the wheel support member around the horizontal axis. The apparatus further includes a single wheel rotatably mounted about a rotation axis which is substantially perpendicular to the horizontal axis, the wheel being coupled to the pivot, disposed between the frame support members, and extending at least partially below the frame support members.

Continuing with this second aspect of the invention, the apparatus includes a motor connected to drive the wheel when energized. Additionally, the apparatus includes a sensor. Finally, the apparatus includes a gyroscopic fore-and-aft balance control system configured to output an energized signal for controlling power being provided to energize the motor. The balance control system activates or deactivates the motor using the energized signal by sensing at the sensor whether a vertical force which causes the wheel support member to rotate around the horizontal axis has been applied to the frame support members, and in which the balance control system instructs the motor to accelerate or decelerate the wheel in accordance with the direction and magnitude of a longitudinal force applied to the frame support members as the vertical force is simultaneously applied.

These and other aspects, features and advantages will be apparent from the following description of certain embodiments of the invention.

DETAILED DESCRIPTION OF CERTAIN EMBODIMENTS OF THE INVENTION

The invention is now described with reference to the accompanying drawings, which form a part hereof, and which show, by way of illustration, example implementations and/or embodiments of the present invention. It is to be understood that other embodiments can be implemented and structural changes can be made without departing from the spirit of the present invention. Among other things, for example, the disclosed subject matter can be embodied as methods, devices, components, or systems.

Furthermore, it is recognized that terms can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The arrangement in certain embodiments provides a moment arm that extends from a pivot point in order to impart a drive force to a gyroscopically-responsive power assist motor, and, in the disclosed embodiments, provides improvements to transport devices by providing such structures. In accordance with a salient aspect of the present invention, a force is received along the direction of intended transport, which is sensed by a sensor that in turn outputs an energized signal to a motorized wheel, to activate the wheel in the direction of the intended transport. The sensor can be selectively responsive to signals. For instance, the sensor can be configured to respond to a sensed rotational or pivoting force by suppressing control or energize signals to the motor, or by sending signals that have the effect of controlling the motor or otherwise deenergizing it so that the wheel is not driven into motion. The present invention provides embodiments that include a controller configured to differentiate between longitudinal and rotational forces in order to advantageously enable an unload operation while the motor-driven wheel is not energized. As such, the load device is not translated forward or backward in response to certain forces applied to a moment arm, whereas it is responsive to other forces applied to the same moment arm. Without loss of generality, the controller in an apparatus constructed in accordance with certain aspects of the invention is configured to selectively activate and assist transport upon reception of a longitudinal force at a distance from the sensor, for instance, while not activating or otherwise causing a power-assist drive to the wheel if such force is of the rotational or pivoting type.

The previously described versions of the present invention have many advantages including, in one aspect, a motor capable of driving a wheel without requiring a load to shift substantially above the gyroscopic-responsive sensor. More specifically, the invention contemplates a rigid coupling of a moment arm to a pivot, in which a load is supported at least partially above the moment arm. Activation of the motor can be accomplished without requiring the load to shift around the pivot point. For example, unlike a gyroscopic self-balancing user transport vehicle in which a load is disposed above the motorized wheel, and in which the vehicle's wheel is driven as the load leans in a travel direction, the present invention does not require a load to lean or shift.

Aspects of the invention can be appreciated in regard to the following discussion which is provided in the context of a wheelbarrow, in accordance with one or more exemplary embodiments. More generally, the invention can be implanted in a vehicle in which there is a moment arm connected to a pivot to provide a gyroscopic-responsive power assist to a motor in order to drive a wheel, which can be to the single wheel of a wheelbarrow as in the disclosed embodiments. It will be appreciated, however, that the invention is not limited to the confines of the wheelbarrow arts, but rather can be employed in vehicles having one or more wheels, including at least one wheel driven by a gyroscopically-responsive controller. The wheelbarrow example is provided as one arrangement in which a load is seated generally above the wheel, yet motor activation is not at all dependent upon shifting the load during any tipping or pivoting of the load, but rather, is due to a force applied remotely at the end of a moment arm.

In one or more embodiments, a gyroscopic sensor is provided to output signals to a motor which drives a wheel. A gyroscopic sensor can sense forces received (e.g., longitudinal or rotational forces) by the apparatus and regulate the motor accordingly in order to drive or not the wheel. For example, in the wheelbarrow example embodiment, in order to unload the wheelbarrow, a load seated above the moment arm can be rotated around a pivot (i.e., the wheelbarrow can be tipped), in which case the gyroscopic sensor sends a signal to the motor to decelerate the wheel until the wheelbarrow is stopped. In another example, upon such movement, the gyroscopic sensor suppresses energizing signals to the motor or sends a deactivating signal to the motor. A gyroscopic sensor provides a means for selectively controlling the acceleration and deceleration of the vehicle along the direction of transport, but also avoids acceleration along the direction of transport if the user pivots the load. In this way, the present invention can provide transport in appropriate circumstances. Examples of electric powered vehicles having suitable gyroscopic sensors are generally described as found in U.S. Pat. No. 3,399,742 issued to Malick, U.S. Pat. No. 6,302,230 issued to Kamen et al., and U.S. Pat. No. 8,807,250 issued to Chen, each of which is hereby incorporated by reference as if set forth in their respective entireties herein.

Referring now to FIGS. 1A-C, a first embodiment is described in regard to an apparatus that can translate an applied longitudinal force into a power-assist by a motor to drive a freely rotatable wheel.

Turning first to FIG. 1A, an apparatus 100 is provided in a stable or rest state, in which no forces are acting on a moment arm 110. At rest, the moment arm 110 is disposed along a longitudinal axis, such as generally parallel to a direction of travel. A proximal end of the moment arm can receive longitudinal and rotational forces from a human user or a vehicle coupled to the proximal end. In an embodiment in which a human user operates the apparatus 100, the proximal end can include rigid handles (e.g., rubber handles) or be advantageously shaped for gripping. In another embodiment, the proximal end can include a hardware coupling that selectively can be engaged and disengaged from another vehicle.

The moment arm can be any rigidly formed component, such as a straight rod, a flexed rod, a rod bent into a wave shape, or an S-shaped rod, as a few non-limiting examples. For example, the proximal end of the moment arm can be disposed at a height from the ground that is greater than a load seated upon or above the moment arm, by using an S- or step-shaped moment arm. Such a load can be adjacent to the moment arm 110, such as contained within a bucket or container coupled to an upper surface of the moment arm, as shown in FIG. 2C. The moment arm can be made of a natural material (e.g., wood, stone, native metals such as copper or aluminum) or man-made materials (e.g., plastic, metallic alloys such as steel, pewter, or bronze).

The moment arm 110 is coupled to a pivot 120, with the pivot configured to provide at least one degree of freedom of movement to the moment arm such that the moment arm can tilt forward or backward (e.g., in a rotational pitching direction around a first rotational axis, generally defined at the location of pivot 120). For example, the distal end of the moment arm 110 is coupled to the pivot 120, or the moment arm is coupled to the pivot while a portion of the moment arm extends through or past the pivot. In one or more embodiments, the pivot 120 provides additional degrees of freedom of movement to the moment arm 110, such as a translational forward and backward motion or rotational yawing or rolling motions. In one or more embodiments, the free rotation of the moment arm 110 around the pivot 120 is limited to one rotational direction away from the longitudinal axis (e.g., a vertical force can be imparted to the moment arm to rotate the proximal end of the moment arm away from the ground, but a corresponding vertical downward force on the moment arm at rest will not rotate the arm in that direction). The pivot can be of any type known to one having ordinary skill in the art, such as a ball and socket joint, a hinge joint, a condyloid joint, or a universal joint.

A connecting member 130 couples the pivot 120 to a wheel 140. The connecting member 130 can be a rod made up of the same type of materials as the moment arm 110, and is included in order to facilitate more practical force conversion from a user to the apparatus 100. For example, the connecting member 130 can raise the height of the moment arm 110 such that a user can more easily use the apparatus 100. In one or more embodiments, the pivot 120 is directly coupled to the wheel 140 without a connecting member 130. For example, the pivot can be disposed adjacent to or incorporated within the wheel 140.

The wheel 140 can be any standard wheel known in the art, consisting of virtually any suitable material (e.g., synthetic or natural rubber, fabric and wire, carbon black, other chemical compounds), whether the wheel is solid or pneumatic, in which the wheel can be rotatably mounted about a second rotational axis. While the wheel 140 can be directly or indirectly connected to the pivot 120, at least some portion of the wheel extends below the moment arm 110 or at least the undersurface of the moment arm (the surface closer to the wheel). In one or more embodiments, the first rotational axis that the moment arm 110 can pivot through is co-planar with the second rotational axis of wheel 140, and both can be substantially perpendicular to the longitudinal axis of the moment arm.

A sensor 150 is included in apparatus 100 for sensing of the forces imparted on the apparatus and outputting signals to a motor 160. The sensor 150 can include one or more sensors configured to sense longitudinal forces applied along the longitudinal axis of the moment arm and configured to sense rotational forces applied about the pivot 120. The motor 160 is of any type known in the art which is capable of driving the wheel 140 to rotate around the second rotational axis. In one or more embodiments, the sensor 150 and the motor 160 are disposed within or are adjacent to the wheel 140, and can be as described in the aforementioned patents that have been incorporated by reference. This can be accomplished, for example, via an external housing component about a portion of the wheel 140. In one or more embodiments, the sensor 150 and the motor 160 can be adjacent to or disposed within any portion or component of apparatus 100 such that the sensor can distinguish between the direction of forces applied to the moment arm 110. For example, the sensor 150 can be disposed at any location within the moment arm 110 (e.g., disposed on or within the rigid handles of the moment arm) or electrically coupled to another sensor within the moment arm in order to more accurately measure the force applied at the moment arm. In one or more embodiments, the sensor 150 is a gyroscopic sensor. Gyroscopic sensors provide the advantage of being able to measure angular displacement as well as rate sensing features (e.g., velocity, acceleration, etc.) in addition to force measurements. Depending on the type of forces and changes in orientation of the moment arm, the sensor 150 outputs energized signals to the motor 160 indicating whether the motor should activate or deactivate, and if activated, whether to accelerate or decelerate wheel 140 rotation in a particular direction.

More specifically, the sensor 150 includes a control system that differentiates between whether a user applies longitudinal force to the moment arm 110 in an intended direction of travel, or if a user pivots the moment arm, such as to unload a load disposed above the moment arm. If a longitudinal force 170 is applied to the moment arm 110, such that the force is along the intended direction of travel, the sensor 150 will send an energized signal to the motor 160 that instructs the motor to activate to drive the wheel 140. For example, if a user pushes forward on the moment arm 110, as in FIG. 1B, the sensor 150 senses this longitudinal force 170 and instructs the motor to accelerate the wheel in a forward direction. Similarly, if a user pulls backward on the moment arm 100, then the sensor 150 instructs the motor to accelerate the wheel in a backward direction. The sensor 150 further includes the capability for sensing the magnitude of the force applied. In this way, a user can control the speed of the apparatus 100 by directing the longitudinal force 170 in either translation direction with force relative to a desired speed (e.g., a larger push equates to higher speed).

In addition, as can be appreciated, the pivot 120 provides at least a degree of freedom of movement to the moment arm 110, such as, for example, a rotational pitch motion, as illustrated by FIG. 1C. If a rotational force 180 is applied to the moment arm 110 to pitch around the pivot 120, the sensor 150 can be configured to differentiate such forces from longitudinal forces 170 and selectively impede signals to the motor (e.g., impede an energize signal), or otherwise send a control signal that instructs the motor 160 to not activate and/or not accelerate the wheel 140. Such a control signal can be coded with an instruction to activate the motor at a zero setting, which is tantamount to sending an off signal, or to send an instruction to maintain the current velocity, and so on. Some of the settings of the control signals in a rotated moment-arm position can be user configurable, in certain embodiments, such as using an app executing on a mobile phone which exchanges control signals in a wireless manner (e.g., using BTLE, for example) with the controller in the apparatus 100.

In one or more embodiments, the sensor 150 detects the rotational force 180 by measuring the angle $\theta$ 190 that the moment arm 110 is displaced from the longitudinal axis. The pivot 120 can limit the maximum angle $\theta$ 190 to any desired maximum angle depending on the desired moment arm pitch range, such as 90 or 180 degrees from the longitudinal axis. Further, the pivot 120 can prevent the moment arm 110 from rotating to an angle $\theta$ 190 that is negative relative to the longitudinal axis of the moment arm (i.e., in a direction toward the ground below the longitudinal axis). In this fashion, the motor 160 is driven only when a user imparts a pushing or pulling motion, as opposed to a tipping or leaning motion about the pivot point. This system has the advantage therefore of allowing a user to tip the moment arm 110 without driving the wheel 140, and presents a departure from conventional drive systems that utilize gyroscopically responsive power-assist systems because pivoting of loads ordinarily causes such systems to energize.

The present invention can be utilized in a broad array of exemplary apparatuses, such as those particularized for load transport. The present invention is particularly suited for load transport because the sensor can distinguish between carrying actions (e.g., pushing the load transport along a desired direction of travel) and unloading actions (e.g., rotating the load in a pitching motion). In this way, a user can push or pull the load transport to receive a power assist, but the motor does not drive the wheel if a user is unloading. In one or more embodiments, the present invention is applied in the context of an example wheelbarrow apparatus. Typical motorized wheelbarrows are activated and controlled unintuitively, such as via switches or twist- or pull-grip handles. The present invention provides the advantage of allowing motor activation to drive a wheel without requiring activation components such as switches or twist- or pull-grip handles.

With reference now to FIGS. 2A-2E, the invention is described in connection with an embodiment comprising a wheelbarrow 200 with a load bucket 205 having upwardly extending walls that define a hollow space therebetween. The load bucket 205 is supported at least partially above a pair of frame support members 210, 215 which extend along their respective longitudinal axes. The load bucket 205 can comprise any type of materials typically known in the art for load buckets, such as plastic, wood, steel, or other metals. The frame members can be the same as frame members 110 discussed above. An upper surface of each frame support member 210, 215 is rigidly coupled to the underside of load bucket 205. While FIGS. 2A-2E illustrate rigid, straight, rectangular prism frame support members, the frame support members can be of any shape (e.g., tubular, triangular prism) and can be contoured in a variety of ways (e.g., curved, a wave shape, stepped, S-shaped). This structure in sum can function as a moment arm (e.g., moment arm 110). In the example wheelbarrow 200, both the proximal and distal ends of each frame support member extend beyond the edges of the load bucket 205, though other embodiments can be constructed in which one or more of the frame support member ends do not extend beyond the edges of the load bucket. In one or more embodiments, the proximal end of the frame support members 210, 215 can include handles or couplings, as described previously.

One or more legs 220, 225 are rigidly coupled to and extend downwards from a lower surface of each frame support member 210, 215 at a location between the two ends of the frame support members. The legs can be of conventional design and construction, and should be selected to enable the wheelbarrow 200 to support the load bucket 205 in a generally horizontal orientation when the wheelbarrow is at rest.

In one or more embodiments, the frame support members 210, 215 can be coupled together by an elongated wheel support member that is transverse to the longitudinal axes of the frame support members along a horizontal axis. An elongated wheel support member can provide additional stability to the wheelbarrow 200. Additionally, a pivot is centrally located relative to the elongated wheel support member, in which the pivot provides rotation of the wheel support member around the horizontal axis. In one or more embodiments, the elongated wheel member is a pivot joint (e.g., pivot 120) or other component which the structure of the framed support members 210, 215 and the load bucket 205 can be made to rotate around.

FIGS. 2A-2E illustrate an elongated wheel support member as a freely rotatable axle 230. The axle 230 is positioned at a location near to the distal ends of the framed support members 210, 215, though it is not required to be at the distal ends. The axle of the example wheelbarrow 200 is tubular, though axles of rectangular, triangular, or other prism shapes can be substituted without departing from the spirit of the invention. In one or more embodiments, the axle 230 extends longitudinally along and is capable of rotation about an axis transverse to the longitudinal axes of the frame support members 210, 215. For example, the axle can be substantially perpendicular to the frame support members. The axle 230 can be supported at least partially above or extend below the frame support members and can be rigidly fixed between the opposing inner surfaces of the frame support members. As can be seen from, for example, FIG. 2D, the axle 230 for the example wheelbarrow 200 extends above the frame support members 210, 215. The axle 230 is fixed to an outer surface of a front portion 245 of the load bucket 205 by a first end of a pair of upper struts 235, 240. The second end of each upper strut 235, 240 is fixed to the axle 230 near the proximal and distal ends of an upper surface of the axle. A pair of lower struts 250, 255 is fixed to the axle 230 near the proximal and distal ends of a lower surface of the axle, in which the lower struts support the axle. In one or more embodiments, the upper struts 235, 240 and lower struts 250, 255 interconnect to form a rigid structure connecting the front portion 245 to the frame support members 210, 215. In one or more embodiments, the upper and lower struts are affixed through or to the proximal and distal ends of the axle 230.

A key feature of axle 230 is that it provides a pivot point for the moment arm of the frame support members 210, 215. The pivot point can be centrally located on the axle 230, which is advantageous for coupling the axle to a wheel 260 to the pivot point. The wheel 260 is rotatably mounted about a rotational axis that is substantially perpendicular to the longitudinal axis of the axle. The wheel 260 extends at least partially below the axle 230 and between and at least partially below the frame support members 210, 215. In one or more embodiments, the wheel 260 can be fixed directly to the axle 230, or coupled to the axle by passing the axle through a channel disposed below an arcuate upper portion of the wheel.

The axle 230 can be coupled to the wheel 260 in any manner reasonable in the art in order to enable a sensor 265 to determine the orientation and type of force imparted upon the frame support member 210, 215 and load bucket 205 structure (e.g., the moment arm) as it interacts with the pivot point of the axle 230. For example, if a user imparts a rotational force to the frame support members 210, 215 (e.g., lifting the frame support members in a direction away from the ground in order to unload the load bucket 205), the axle 230 rotates in a way measurable by a sensor 265. For example, the sensor 265 can measure the angle at which the frame support members 210, 215 depart from a resting position. Similarly, the sensor 265 can measure if a longitudinal force is applied (e.g., longitudinal force 170 in FIG. 1B).

The sensor 265 can include one or more sensors capable of sensing and differentiating between the different force types described hereinabove. In one or more embodiments, the sensor 265 is a gyroscopic sensor. The gyroscopic sensor can include any of the type known in the art which are capable of sensing rotational motion and changes in orientation, including the variety described in the aforementioned patents that have been incorporated by reference. In one or more embodiments, the sensor 265 senses when a user rotates the axle 230 via changing the angle of the frame support members 210, 215 relative to the longitudinal axis that the frame support members occupy in a rest position. In one or more embodiments, the sensor 265 includes a balance control system for sensing external forces, such as the direction and magnitude of a force applied to the frame support members 210, 215.

Depending on the type of force that the sensor 265 senses, a signal is output to a motor 270. The motor 270 can be of any type known in the art, which is capable of driving the wheel 260 to rotate and thus drive the wheelbarrow 200 in a transport direction. In one or more embodiments, the motor 270 is included within the wheel 260, such as within a wheel housing. Alternatively, the motor 270 can be coupled to any other component in the wheelbarrow 200 that is suitable for receiving a signal from sensor 265 and from which it can appropriately drive the wheel 260.

If the control system receives from the sensor 265 a signal that a longitudinal force has been applied to the frame support members 210, 215 (e.g., a pushing or pulling motion) then the sensor 265 outputs an energizing signal to the motor 270, instructing the motor to accelerate or decelerate the wheel in accordance with the direction and magnitude of the applied longitudinal force. If the sensor 265 senses that a rotational force (e.g., a vertical force applied at the frame support members 210, 215) has been applied at the pivot point of the axle 230, then the control system can provide a signal that instructs the motor 270 to not active and/or not accelerate the wheel 140. Such a control signal can be coded with an instruction to activate the motor at a zero setting, which is tantamount to sending an off signal, or to send an instruction to maintain the current velocity, precisely as noted above. In addition, settings for control signals can be user configurable in certain embodiments, as described above. Alternatively, the control system can impede an energize signal from being sent to the motor 270 in response to the rotational force being sensed, or a rotational force beyond a lift off of the ground. In one or more embodiments, if a prescribed rotational force is applied, such as one that is clearly more than a lift off of the ground, the controller can send a signal to the motor 270 instructing it to deactivate the wheel. In one or more embodiments, in which the wheelbarrow 200 at rest is in contact with the ground, such as via legs 220, 225, the sensor 265 and/or its balance control system can be configured to send an energizing signal to the motor 270 upon an applied longitudinal force only if a small rotational force is applied first, such as the vertical force necessary to raise the wheelbarrow a predetermined distance off the ground. For example, the sensor can require that the longitudinal and vertical forces be applied simultaneously to drive the wheel 260. In this way, the wheelbarrow 200 can be prevented from moving in a translational direction while it is at rest.

Notably, the figures and examples above are not meant to limit the scope of the present application to a single embodiment, as other embodiments are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific embodiments will so fully reveal the general nature of the application that others can, by applying knowledge within the skill of the relevant art(s) (including the contents of the documents cited and incorporated by reference herein), readily modify and/or adapt for various applications such specific embodiments, without undue experimentation, without departing from the general concept of the present application. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present application have been described above, it should be understood that they have been presented by way of example, and not limitation. It would be apparent to one skilled in the relevant art(s) that various changes in form and detail could be made therein without departing from the spirit and scope of the application, while the invention is defined by the features recited in the claims that follow and the respective equivalents of those individual features.

What is claimed:

1. An apparatus for providing a gyroscopically-responsive power assist to a user for carrying a load, comprising:
   a frame support;
   an elongated wheel support member coupled transversely across the frame support along a horizontal axis that is perpendicular to a longitudinal axis of the frame support, wherein the frame support rotates about the horizontal axis at a pivot point of the elongated wheel support member;
   one or more wheels rotatably mounted substantially perpendicular to the horizontal axis, the one or more wheels being coupled to the elongated wheel support member, and extending at least partially below the frame support;
   a motor to drive at least one of the one or more wheels when energized;
   a sensor; and
   a gyroscopic fore-and-aft balance control system configured to output an energized signal which controls whether power is being provided to energize the motor,
   wherein the balance control system deactivates the motor using the energize signal after sensing, by the sensor, a rotational force applied to the frame support about the pivot point, and wherein the balance control system activates the motor using the energize signal after sensing, by the sensor, a longitudinal force applied to the frame support and instructs the motor to accelerate or decelerate the one or more wheels in accordance with the direction and magnitude of the longitudinal force applied to the frame support.

2. The apparatus according to claim 1, wherein the elongated wheel support member is attached to an upper surface of the frame support.

3. The apparatus according to claim 1, wherein the elongated wheel support member is attached to a lower surface of the frame support.

4. The apparatus according to claim 1, wherein the frame support has opposing inner surfaces, and wherein the elongated wheel support member is attached between the opposing inner surfaces.

5. The apparatus according to claim 1, further comprising a housing in which the motor is disposed.

6. The apparatus according to claim 1, wherein the frame support has a proximal end, the apparatus further comprising a pair of handles, each handle being attached to the proximal end of the frame support.

7. The apparatus according to claim 1, further comprising a load bucket coupled to the frame support and having upwardly extending walls that define a hollow space therebetween.

8. The apparatus according to claim 7, wherein the frame support is coupled to a bottom surface of the load bucket.

9. The apparatus according to claim 7, wherein a portion of the frame support extends longitudinally beyond a rear portion of the load bucket.

10. The apparatus according to claim 7, wherein a portion of the frame support extends longitudinally beyond a front portion of the load bucket.

11. The apparatus according to claim 7, wherein a distal end of the frame support does not extend longitudinally beyond a front end of the load bucket.

12. The apparatus according to claim 1, wherein the elongated wheel support member is coupled transversely across the frame support by one or more struts positioned at the proximal and distal ends of the elongated wheel support member.

13. An apparatus for providing a power assist, comprising:
   a moment arm component disposed along a longitudinal axis, having a proximal end and a distal end;
   a pivot coupled to a distal end of the moment arm component, wherein at least a portion of the moment arm component rotates along a first rotational axis about the pivot;
   a wheel rotatably mounted about a second rotation axis, the wheel being coupled with the pivot, and extending at least partially below of the moment arm component;
   a motor to drive the wheel when energized;
   one or more sensors configured to sense a longitudinal force applied substantially along the longitudinal axis and configured to sense a rotational force applied about the pivot; and
   a control system configured to output an energize signal which controls whether power is being provided to energize the motor,
   wherein the control system deactivates the motor using the energize signal after sensing, by the one or more sensors, a rotational force applied to the moment arm component about the pivot, and wherein the control system activates the motor using the energize signal after sensing, by the sensor, a longitudinal force applied to the moment arm component and instructs the motor to accelerate or decelerate the wheel in accordance with the direction and magnitude of the longitudinal force applied to the moment arm component.

14. The apparatus according to claim 13, wherein the first rotational axis and the second rotational axis are disposed in a plane substantially perpendicular to the longitudinal axis.

15. The apparatus according to claim 13, further comprising a connecting member having a proximal end coupled to the pivot and having a distal end coupled to the wheel.

16. The apparatus according to claim 13, wherein one or more sensors are disposed on or within the moment arm component.

17. The apparatus according to claim 13, wherein one or more sensors are disposed on or within the wheel.

18. The apparatus according to claim 13, wherein one or more sensors include a gyroscopic sensor.

19. The apparatus according to claim 13, wherein the one or more sensors are disposed on or within one or more rigid handles coupled to the proximal end of the moment arm component.

20. The apparatus according to claim 13, further comprising a load bearing component adjacent to the moment arm component.

* * * * *